L. C. ERBES.
WHEEL TREAD.
APPLICATION FILED AUG. 31, 1911.
1,038,103.
Patented Sept. 10, 1912.
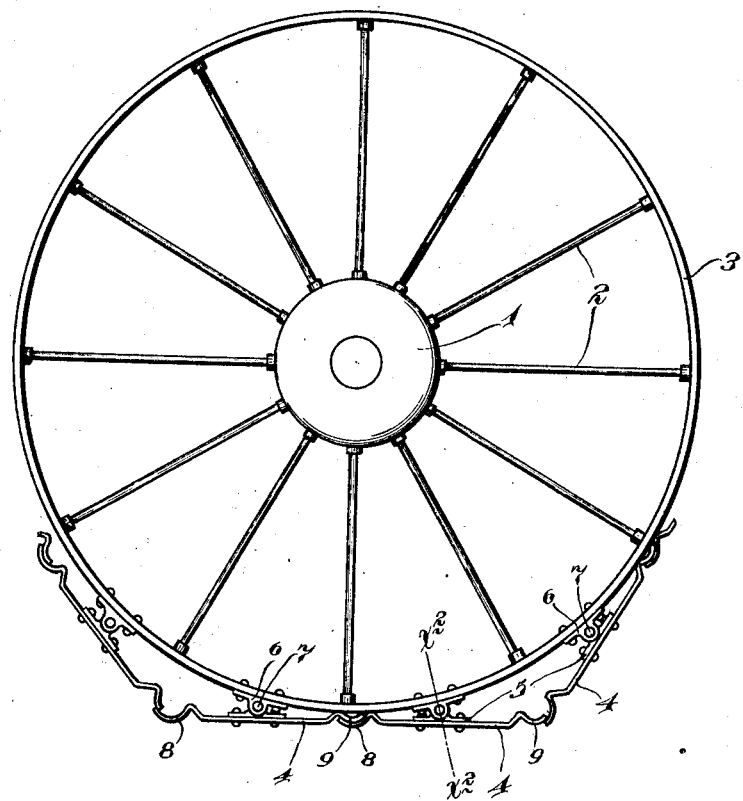
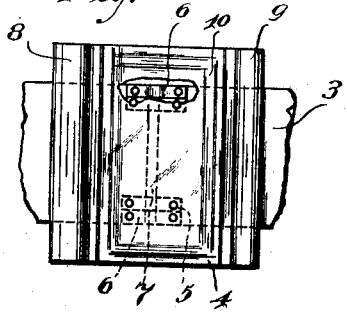
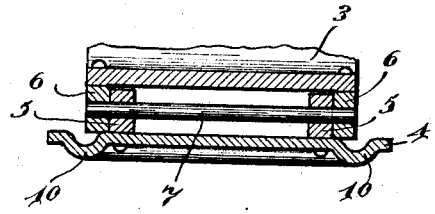
Witnesses:
Geo. Knutson
H. G. Hillgren
Inventor:
L. C. Erbes
By his Attorneys
Williamson & Merchant

UNITED STATES PATENT OFFICE.

LOUIS C. ERBES, OF ST. PAUL, MINNESOTA.

WHEEL-TREAD.

1,038,103.  Specification of Letters Patent.  Patented Sept. 10, 1912.

Application filed August 31, 1911. Serial No. 647,036.

*To all whom it may concern:*

Be it known that I, LOUIS C. ERBES, a citizen of the United States, residing at St. Paul, in the county of Ramsey and State of Minnesota, have invented certain new and useful Improvements in Wheel-Treads; and I do hereby declare the following to be a full, clear, and exact description of the invention, such as will enable others skilled in the art to which it appertains to make and use the same.

My invention has for its object to provide an improved wheel tread, and to such ends, generally stated, the invention consists of the novel devices and combinations of devices hereinafter described and defined in the claim.

In the accompanying drawings which illustrate the invention, like characters indicate like parts throughout the several views.

Referring to the drawings, Figure 1 is a side elevation showing the wheel provided with tread plates in accordance with my invention, some parts being removed; Fig. 2 is an enlarged transverse section taken on the line $x^2$ $x^2$ of Fig. 1; and Fig. 3 is a bottom plan view showing one of the tread plates and a portion of the wheel rim, some parts being broken away.

So far as my invention is concerned, the wheel may be of any suitable construction, and it may be either a traction wheel, or a wheel of any other type. As shown, it comprises a hub portion 1, spokes 2, and a rim 3, which latter is in the form of a smooth wide-faced band. The tread plates are intermediately pivoted to the outer face of the wheel rim 3 and their ends are arranged to overlap, so that they afford a continuous or complete sectional tread. The said tread plates may be constructed in various ways, and while in some instances, they may be cast, they are, nevertheless, usually and preferably stamped from steel plates. These tread plates, as preferably constructed, are indicated by the numeral 4, and at their intermediate portions, they are provided with laterally spaced hinge lugs 5 that are pivotally connected to similar hinge lugs 6 on the wheel rim, by means of heavy hinge pins or bolts 7. At their ends, the tread plates are formed with longitudinally curved, transversely extended end portions 8 and 9. The curved portions 8, at one end of the tread plates, are made with slightly greater curve than the curved portion 9 at the other end of said plates, so that the said curved sections of adjacent tread plates will overlap and take up, or compensate for the separating movement which takes place between the ends of the plates when they are moved pivotally. To illustrate, it will be noted, that at the central connection between tread plates which takes place at the extreme lower portion of the wheel rim, the engaged curved portions 8 and 9 are overlapped to the limit, while on opposite sides of this joint, the said overlapped sections 8 and 9 are nearly, but not quite, separated. Under movements of the tread plates, the engaging curved sections 8 and 9 have a sort of circular sliding action, one upon the other. The arc of the curved portions 8 and 9, and the length of the bar of the tread plates, will depend largely on the size of the wheel. Tread plates will usually be made much wider than the face of the wheel rim, so that a very wide base of support for the wheel is provided.

The tread plates, when stamped of steel or sheet metal, are preferably reinforced and stiffened by downwardly pressed corrugations 10, preferably in rectangular arrangement, so that they will run both transversely and circumferentially of the wheel. These corrugations also increase the tractive power of a traction wheel, when used in this connection.

When the wheel is rotated the tread plates are, of course, brought in succession, or serially, into contact with the ground, and they have this important advantage over an ordinary wheel rim, that they are brought flatwise against the ground, and hence, do not have the forwardly crowding action which is produced by an ordinary wheel working in soft ground. A wheel of this character of tread is, therefore, extremely well adapted for use on soft ground and on sandy roads. It will, for instance, be found very serviceable for use on wagons or other vehicles which must travel over desert land.

When the improved tread is used on agricultural machinery, it will run over soft ground without packing the ground to such an extent that crops will not grow where the wheel has traveled. The improved tread is also well adapted for use on a soft packing wheel or roller where it is desirable that the ground simply be packed uniformly by a downward pressure.

As already indicated, the improved tread may be applied on wheels of various different kinds of vehicles, whether self propelled or whether drawn by horses, or other power.

What I claim is:

The combination with a wheel, of an endless series of tread plates intermediately pivoted to the wheel rim and provided at their opposite ends with transversely curved sections, the arc of the one curved end being larger than the arc of the other curved end, and the curved ends having the smaller arc being always overlapped with adjacent curved ends having the larger arc, said overlapped ends having a rocking action, one with the other, when the said tread plates move, substantially as described.

In testimony whereof I affix my signature in presence of two witnesses.

LOUIS C. ERBES.

Witnesses:
BERNICE G. WHEELER,
HARRY D. KILGORE.